June 24, 1952 — J. P. JONES — 2,601,399

DISPENSING MILK CONTAINER

Filed May 21, 1945

Inventor:
John Paul Jones
By Kent W. Worrell
Attorney

Patented June 24, 1952

2,601,399

UNITED STATES PATENT OFFICE 2,601,399

DISPENSING MILK CONTAINER

John Paul Jones, Omaha, Nebr., assignor to Dairy Specialties, Inc., a corporation of Nebraska Application May 21, 1945, Serial No. 594,972

3 Claims. (Cl. 222—482)

This invention relates in general to a milk container and is more particularly described as a cream dispensing aperture for a paper milk bottle.

An important object of the invention is to provide a cream discharging aperture and spout in connection with the ordinary pouring aperture of a paper milk bottle.

A further object of the invention is to provide a cream dispensing aperture in a paper milk bottle in conjunction with an ordinary milk pouring aperture such that the cream dispensing aperture can be utilized after the ordinary pouring aperture is opened.

Still a further object of the invention is to provide ordinary pouring and cream dispensing apertures in a paper milk bottle, the cream dispensing aperture having a projection into the ordinary pouring aperture to assist in opening it.

Still a further object of the invention is to provide a combined cream and milk pouring aperture at different levels in the side of a paper milk bottle, both covered by the same opening flap.

Still a further object of the invention is to provide a paper milk bottle with an upper pouring aperture and a lower cream dispensing aperture, the latter being provided with a spout which is initially operated from the upper pouring aperture.

A still further object of the invention is to provide a paper milk bottle with a pouring spout located within the wall of the bottle, and movable outwardly therefrom, the outward movement of the spout being limited by engagement of the inner ends thereof with the wall of the bottle.

A further object of the invention is to provide a paper milk bottle having a milk pouring opening and a cream pouring opening, the cream pouring opening being closed by a spout which is movable outwardly in the opening, the outward movement of the spout confining the side walls of the spout in contact with the waxed edges of the walls to make a more nearly fluid tight joint for the spout.

Other objects of the invention will appear in the specification and will be apparent from the accompanying drawings in which, Fig. 1 is a side elevation of the upper portion of a milk container in closed or unbroken condition embodying the principles of this invention;

Figure 1:
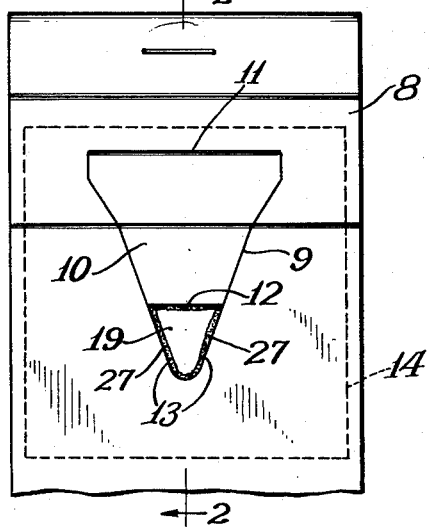
Figure 2:
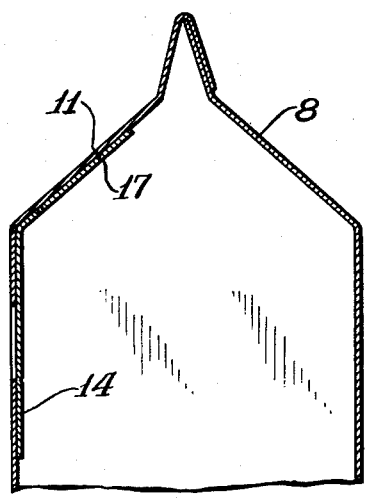
Fig. 2 is a sectional view taken on the line 2—2 of Fig. 1.
Figure 3:
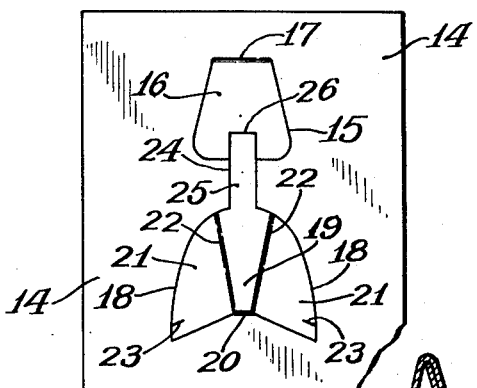
Fig. 3 is a plan view of the insert attached to the inside of the apertured wall of the container.
Figure 4:
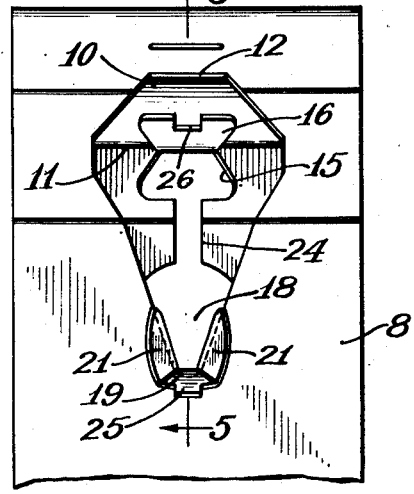
Fig. 4 is a side view of the upper end of the container with milk and cream dispensing openings uncovered and open.
Figure 5:
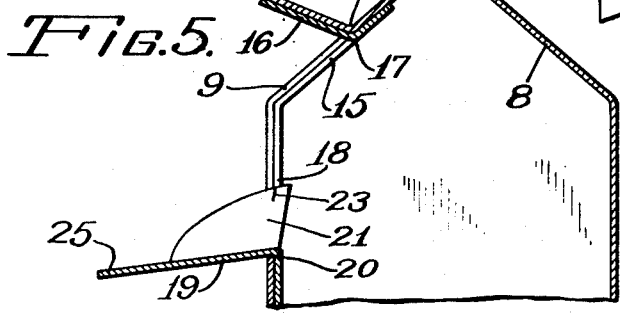
Fig. 5 is a sectional view taken on the line 5—5 of Fig. 4.

In dispensing milk and cream from a paper milk bottle, it is desirable to provide means for pouring the entire contents of the container therefrom, and also to discharge the cream accumulated at the top of the milk if desired. To accomplish this successfully, it is necessary to have the cream pouring opening at the lower level of the cream in a container of this kind, and also to provide for the inward movement of air above the cream pouring aperture. In the present invention, this is accomplished by connecting an ordinary upper pouring aperture with a lower spout which may be pulled outwardly from the inside of the container by engaging a tongue projecting upwardly from the bottom of the ordinary pouring aperture. Thus both of the pouring apertures may be sealed by the same cover in the outer wall, and a space is provided at the bottom of the cover which is sealed with wax or other similar material, the wax forming a sealing agent for engaging the side walls of the cream pouring spout when it is pulled outwardly through the outer wall opening.

Referring now more particularly to the drawings, the upper portion of a container 8 of the paper milk bottle type is shown having an opening 9 near the top closed by a cover 10 having a top hinge line 11. The lower sides of the opening converge towards the bottom and the cover has a lower edge 12 which terminates at a distance above the lower converging edges 13 of the bottom leaving a space which is not closed by the cover, but provides a means for engaging the lower edge of the cover in opening the cover.

At the inside of the container is an inner wall insert 14 adhesively secured to the inner side of the outer wall covering and overlapping the opening 9 in the outer wall. In the inner wall is an upper pouring aperture 15 having a closure flap 16 with an upper hinge line 17 positioned just below the hinge line 11 of the cover 10 and adhesively secured thereto so that when the cover 10 is raised, the flap 16 is also raised opening the pouring aperture 15.

Below the upper pouring aperture in the inner wall is a cream pouring aperture 18 having a spout 19 mounted therein by a hinge line 20 at the bottom, the spout flaring upwardly or outwardly from the hinge line and having side wings 21 attached thereto by fold lines 22. Near the lower or outer edges of the wings are inwardly extending slits 23 which form stops for engaging the inside of the converging lower edges 13 of the outer opening 9.

Connecting the upper and lower apertures of the inner wall insert is a slot 24, and a projection 25 at the outer end of the spout extends through the slot and upwardly into a notch 26 in the lower edge of the upper flap 16. All of these parts, that is the flap 16, the spout 19, its side wings 21 and the projection 25 are cut out of the material of the inner wall insert and completely fill the upper and lower apertures 15 and 18 and the connecting slot 24.

The inner wall or insert is adhesively applied to the inside of the outer wall in making the container and these parts are commonly coated with wax or wax-like material which seals the parts in their openings and fills the exposed crevices to preserve the material of the container and also to prevent the escape of the contents of the container.

In the recess at the bottom of the outer wall opening between the lower edge 12 of the cover and the converging side walls 13 of the opening, a small amount of coating wax 27 will collect along the converging edges on top of the inner wall and on top of the spout portion which underlies this portion of the outer wall so that when the spout 19 is pulled downwardly and outwardly, the edges and bottom of the spout will engage the converging edges 13 of the outer wall opening causing the side wings 21 of the spout to be engaged by the edges of the opening wiping against the wax 27 accumulated along these edges, thereby making a substantially fluid tight engagement of the side wings with the converging lower edges 13 so that there will be no escape of the liquid contents of the container between the spout and the upper side wings thereof.

In operation, assuming the container to be filled with milk, the opening closed, and the cream extending from approximately the hinge line 20 of a spout upwardly therefrom into the upper pouring aperture closed by the flap 16, the outer cover 10 is raised by engaging the lower edge 12 with a sharp instrument or the fingernail, which causes the upper opening flap 16 also to be raised. If desired, the entire contents of the container may be discharged through this upper pouring aperture 15 by tipping or inclining the container, but if it is desired to separate the cream and to pour it from the container it may be allowed to rest upon its bottom in upright position. The projection 25 which extends upwardly in the bottom of the upper opening 15 provides a convenient finger hold for engaging the pouring spout 19 and moving it downwardly and outwardly into pouring position and from which all of the cream is drawn off without tipping the container. This movement also engages the edges of the outer wall opening 13 with the outer sides of the spout wings 21 moving them into outwardly flaring position, and the outward movement of the wings and of the spout being limited by the engagement of the slotted portions at the ends of the wings, the flexing movement of the wings causing these slotted portions to engage at the inside of the outer wall to limit the outward movement of the spout. If desired, an additional thickness or thicknesses of paper may be added to seal the spout tighter at its sides.

In this manner, the spout is extended and the cream may be separated, poured or removed from the remainder of the contents of the container. With this construction, there is no waste of material and no use of extra material. An inside wall is necessary to provide a cover for the opening in the outer wall, the outer wall opening is changed and the cover therefor protects both the upper and lower apertures in the inner wall, the outer cover must be raised in order to actuate the pouring spout, and either one or both of the pouring apertures may be used if desired.

Various changes in the construction, combination and arrangement of the parts may be made without departing from the spirit and scope of the invention.

I claim:

1. A milk and cream separating container of the waxed paper type having an outer side wall with an opening with sides converging toward the bottom and a closure hinged at the top of the opening, an inner wall portion to cover the opening and adhering at the inside of the outer wall, the inner wall having an upper aperture covered and sealed by said closure and a lower aperture at the bottom of the opening connected to the upper opening by a central slot, a spout hinged at the bottom of the lower aperture and sealing it when closed, the spout having a projection which fills and seals the slot and has a manually engageable extremity extending into the top aperture and covered by the closure, the upper aperture being opened when the closure is raised, and the lower aperture being opened when the spout is pulled down and extended against the said converging sides.

2. A milk and cream separating container of the paper bottle type having an outer substantially vertical side wall inclined inwardly at the top with an opening having lower converging sides and a cover hinged at the top of the opening, an inner wall secured to the outer wall having an upper dispensing aperture near the top of the opening, the inner wall having a cream dispensing closure spout at the bottom of the opening hinged at the bottom of the opening and movable downwardly about the hinge to form a lower inner wall aperture when it is open and with hinged side wings to engage the said lower converging sides, the spout having a manually engageable projection extending into the upper aperture, and the outer edges of the side wings having cut portions therein to engage the said converging sides and limit the outward movement of the spout, the pouring spout being operable to draw off cream from the top of the milk while the container remains in upright untilted position.

3. A milk and cream separating container of the paper bottle type having an inner wall portion with an upper pouring aperture and a lower pouring aperture joined by a central slot, the lower aperture having a spout hinged at the bottom of the lower aperture to the wall portion and with side wings hinged to the spout and a projection extending through the slot into the bottom of the upper aperture and a closure flap hinged at the top of the upper aperture all cut from the material of the inner wall and closing the apertures and slot when the container is closed, an outer wall with an opening having downwardly converging sides and an upwardly raisable cover hinged at the top to substantially fill the opening and adhering to the said closure flap for opening it with the cover, the spout being withdrawn through the lower aperture by manually engaging the projection in the upper aperture and pulling the spout outwardly, the side wings of the spout resiliently engaging the converging lower sides of the outer wall opening to hold the wings inclined at the sides of the spout, and means on the side wings to engage the said converging lower sides to limit the outer movement of the spout, the spout being movable downwardly to discharging position to draw off cream from the top of milk in the container while the container remains in upright untilted position.

JOHN PAUL JONES.

REFERENCES CITED

The following references are of record in the file of this patent:

UNITED STATES PATENTS

| Number | Name | Date |
|---|---|---|
| 883,738 | Patterson | Apr. 7, 1908 |
| 1,837,750 | Becker | Dec. 22, 1931 |
| 1,870,489 | Brucker | Aug. 9, 1932 |
| 2,145,181 | Kennedy | Jan. 24, 1939 |
| 2,332,205 | Clanon | Oct. 19, 1943 |